F. W. REDDING.
TIRE.
APPLICATION FILED DEC. 1, 1911.

1,065,907.

Patented June 24, 1913.

Witnesses
Edwin G. McKee
Annie J. Hind.

Inventor
Frederick W. Redding
By Geo. W. Sues
Attorney

UNITED STATES PATENT OFFICE.

FREDERICK W. REDDING, OF JACKSONVILLE, MISSOURI.

TIRE.

1,065,907. Specification of Letters Patent. Patented June 24, 1913.

Application filed December 1, 1911. Serial No. 663,343.

*To all whom it may concern:*

Be it known that I, FREDERICK W. REDDING, a citizen of the United States, and a resident of Jacksonville, in the county of Randolph and State of Missouri, have invented certain new and useful Improvements in Tires, of which the following is a specification, reference being had to the accompanying drawings.

This invention relates to improvements in cushion tires for vehicle wheels.

One object of the invention is to provide a cushion tire constructed in such a manner as to absorb all shocks and jars occasioned by the passage of the wheel over rough surfaces and which will possess all the advantages of a pneumatic tire without having the disadvantages thereof.

Another object is to provide a tire of this character having an outer shoe or casing arranged thereon and adapted to protect the tire from wear and to prevent the openings in the tire from taking up and throwing mud or water.

With these and other objects in view the present invention consists in the combination and arrangement of parts as hereinafter more fully described and finally pointed out in the appended claim, it being further understood that changes in the specific structure shown and described may be made within the scope of the claim, without departing from the spirit of the invention.

Figure 1:
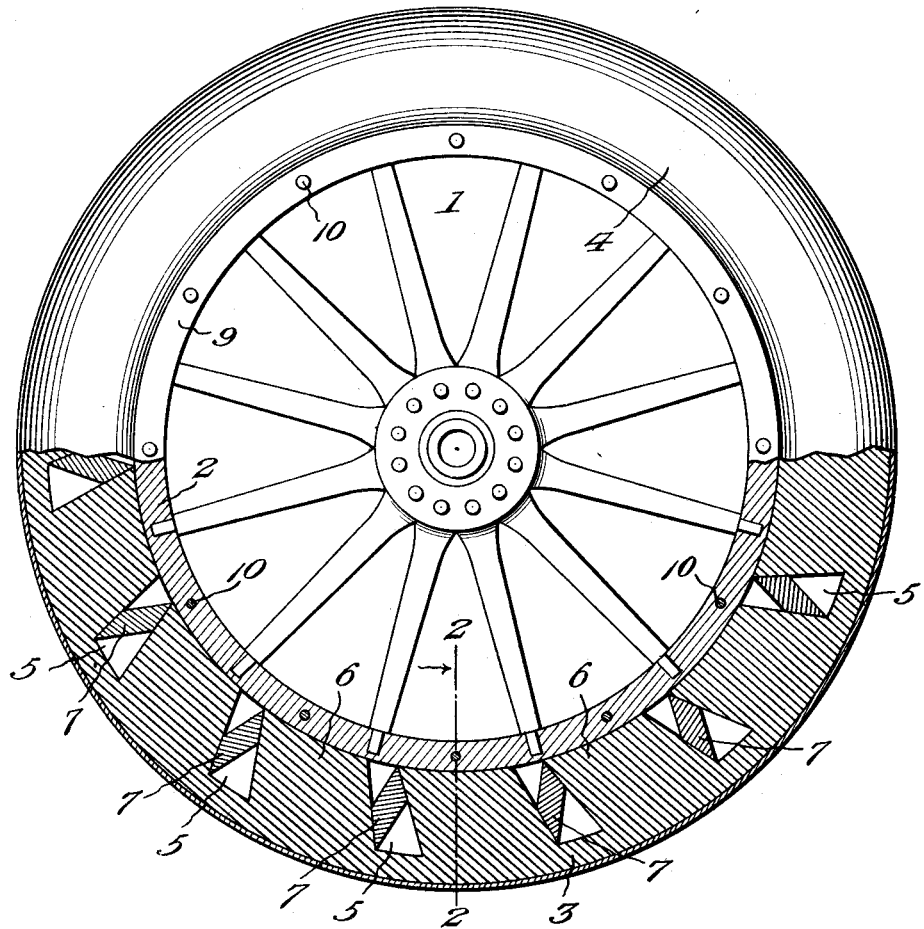
Figure 2:
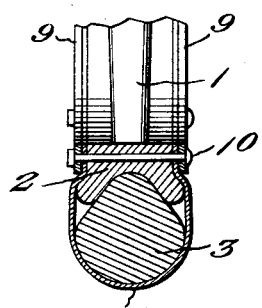

In the accompanying drawings forming a part of this specification and in which like numerals of reference indicate similar parts in the several views: Figure 1, is a side view partly in section of a wheel having my improved tire applied thereto. Fig. 2, is a detail cross sectional view through one side of the wheel rim and the tire taken on the line 2, 2, of Fig. 1.

Referring more particularly to the drawing 1 denotes the wheel which has a grooved rim 2, of the usual or any desired construction. With the rim 2 is engaged my improved tire 3, which is formed of rubber and preferably has a rounded or curved outer tread surface 4, which tapers toward its inner or rim engaging surface, to closely fit the groove in the rim of the wheel, as clearly shown in Fig. 2 of the drawings.

In the tire are formed a series of transversely disposed passages or recesses 5, arranged at intervals, and spaced equal distances apart. The passages or recesses are arranged at an angle and form between themselves obliquely extending blocks or pillars 6, of rubber, which are also disposed at an angle as shown, whereby a greater spring or resiliency is imparted to the tire. In each of the passages 5 is arranged an obliquely extending bracing bar 7, formed of rubber, said bars being disposed at an angle or inclination opposite to the angle or inclination of the passages 5 and blocks 6. The ends of the bars 7 are formed to closely engage and fit against the opposite sides of the passages near the ends thereof, as shown. By forming the tire as herein shown and described, a cushioned or yielding support for the wheel is provided which will absorb all shocks occasioned by the wheel passing over rough surfaces and at the same time forms an efficient cushioned support for the wheel.

The tire is preferably provided with a casing or shoe 8 formed of any suitable material and which entirely covers the tire. The casing 8 effectually protects the tire from wear or injury and also prevents the passages 5 from taking up and throwing dust, mud and water. The casing or shoe is securely fastened at its opposite sides to the rim of the wheel by clamping rings 9, which are engaged with the edges of the casing and are firmly secured to the rim by clamping bolts 10, arranged through the rings and through the rim of the wheel and edges of the casing, as shown.

A tire constructed as herein shown and described will yieldingly support the weight of the load applied to the wheel and will not be affected by punctures. By providing the casing 8, the tire will be protected from wear or injury and will last indefinitely while the casing when worn out may be readily removed and replaced by a new casing at a comparatively small expense.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my said invention, what I claim as new and desire to secure by United States Letters Patent is:

A cushion tire for vehicle wheels comprising a resilient body having therein a series of transverse passages formed at an angle with the radius and providing between themselves obliquely disposed blocks or pillars and obliquely held bracing bars arranged in said passages and disposed at an angle opposite to the angle of the blocks.

In testimony whereof I affix my signature, in presence of two witnesses.

FREDERICK W. REDDING.

Witnesses:
M. RAY,
G. W. McCANNE.

Copies of this patent may be obtained for five cents each, by addressing the "Commissioner of Patents, Washington, D. C."